(12) United States Patent
Flynn et al.

(10) Patent No.: US 9,080,536 B2
(45) Date of Patent: Jul. 14, 2015

(54) SYSTEMS AND METHODS FOR EXHAUST GAS RECIRCULATION

(75) Inventors: Paul Lloyd Flynn, Fairview, PA (US); Eric David Peters, Erie, PA (US); Michael Allen Easter, Erie, PA (US)

(73) Assignee: General Electric Company, Schenectady, NY (US)

( * ) Notice: Subject to any disclaimer, the term of this patent is extended or adjusted under 35 U.S.C. 154(b) by 702 days.

(21) Appl. No.: 13/034,317

(22) Filed: Feb. 24, 2011

(65) Prior Publication Data

US 2012/0216530 A1  Aug. 30, 2012

(51) Int. Cl.
| | |
|---|---|
| F02B 47/08 | (2006.01) |
| F02M 25/07 | (2006.01) |
| F02B 33/44 | (2006.01) |
| F02M 35/10 | (2006.01) |
| F02B 29/04 | (2006.01) |

(52) U.S. Cl.
CPC ....... *F02M 25/0722* (2013.01); *F02M 25/0749* (2013.01); *F02M 35/10222* (2013.01); *F02B 29/04* (2013.01); *F02M 25/0726* (2013.01); *Y02T 10/121* (2013.01)

(58) Field of Classification Search
USPC ...................... 123/568.17; 60/605.2; 701/108
See application file for complete search history.

(56) References Cited

U.S. PATENT DOCUMENTS

| | | | |
|---|---|---|---|
| 4,135,481 A | | 1/1979 | Resler, Jr. |
| 4,179,892 A | * | 12/1979 | Heydrich ...................... 60/605.2 |
| 4,249,382 A | | 2/1981 | Evans et al. |
| 4,445,487 A | * | 5/1984 | Higashi ..................... 123/568.17 |
| 5,207,714 A | * | 5/1993 | Hayashi et al. ........... 123/568.17 |
| 5,611,204 A | | 3/1997 | Radovanovic et al. |
| 5,957,116 A | | 9/1999 | Haegele et al. |
| 6,216,458 B1 | * | 4/2001 | Alger et al. ................... 60/605.2 |
| 6,237,336 B1 | | 5/2001 | Feucht et al. |
| 6,293,266 B1 | | 9/2001 | Oetting |
| 6,401,699 B1 | * | 6/2002 | Persson et al. ............ 123/568.12 |
| 6,543,230 B1 | * | 4/2003 | Schmid ........................ 60/605.2 |
| 6,789,531 B1 | | 9/2004 | Remmels |
| 6,899,090 B2 | | 5/2005 | Arnold |

(Continued)

FOREIGN PATENT DOCUMENTS

| | | | |
|---|---|---|---|
| DE | 102006035183 A1 | * | 1/2008 |
| WO | 2007125233 A1 | | 11/2007 |

OTHER PUBLICATIONS

English Translation of the reference to Kanning et al. (DE 102006035183 A1), published on Jan. 31, 2008.*

*Primary Examiner* — Thomas Denion
*Assistant Examiner* — Jessica Kebea
(74) *Attorney, Agent, or Firm* — GE Global Patent Operation; John A. Kramer

(57) ABSTRACT

An engine system includes a first cylinder group, a second cylinder group, an inlet manifold coupled to the first cylinder group and the second cylinder group, an inlet passage coupled to the inlet manifold to provide inlet air to the inlet manifold, a first exhaust manifold coupled to the first cylinder group, a second exhaust manifold coupled to the second cylinder group, and a mixer pipe positioned within the second exhaust manifold and/or the intake passage to mix exhaust gas recirculation (EGR) gases exhausted by the second cylinder group that are delivered through the second exhaust manifold with inlet air. The mixer pipe forms an inlet end that is coupled to the second exhaust manifold and an outlet end that is located upstream of the cylinders in the first cylinder group and the cylinders in the second cylinder group.

19 Claims, 3 Drawing Sheets

(56) References Cited

U.S. PATENT DOCUMENTS

| | | |
|---|---|---|
| 6,935,319 B2 | 8/2005 | Aupperle et al. |
| 6,935,321 B1 | 8/2005 | Sullivan et al. |
| 6,945,238 B2 | 9/2005 | Huebler |
| 6,964,158 B2 * | 11/2005 | Abdul-Khalek ............ 60/278 |
| 7,013,879 B2 | 3/2006 | Brookshire et al. |
| 7,028,680 B2 | 4/2006 | Liu et al. |
| 7,389,770 B2 | 6/2008 | Bertilsson et al. |
| 7,444,815 B2 * | 11/2008 | Baumgard et al. ........ 60/605.2 |
| 7,945,376 B2 * | 5/2011 | Geyer et al. ................ 701/108 |
| 8,561,599 B2 * | 10/2013 | Gingrich et al. ......... 123/568.17 |
| 2001/0027782 A1 * | 10/2001 | Bianchi et al. .......... 123/568.11 |
| 2004/0074480 A1 * | 4/2004 | Chen et al. .............. 123/568.12 |
| 2007/0175215 A1 * | 8/2007 | Rowells ..................... 60/605.2 |
| 2007/0193270 A1 * | 8/2007 | Roozenboom et al. ......... 60/612 |
| 2008/0216475 A1 * | 9/2008 | Kasper et al. .............. 60/605.2 |
| 2009/0199825 A1 * | 8/2009 | Piper et al. .............. 123/568.21 |
| 2011/0030662 A1 * | 2/2011 | Zitzler et al. ............ 123/568.12 |
| 2011/0041495 A1 | 2/2011 | Yager |
| 2011/0107986 A1 * | 5/2011 | Winstead .................. 123/90.15 |
| 2012/0204845 A1 * | 8/2012 | Gingrich et al. ......... 123/568.17 |

* cited by examiner

SYSTEMS AND METHODS FOR EXHAUST GAS RECIRCULATION

FIELD

The subject matter disclosed herein relates to exhaust gas recirculation (EGR) systems and methods.

BACKGROUND

Engine systems may include cylinders that exhaust gas to an exhaust pipe and donor cylinders that exhaust gas that is routed to an inlet manifold in what is referred to as Exhaust Gas Recirculation (EGR). One benefit of utilizing donor cylinders is backpressure created from routing EGR gasses to the inlet manifold may be limited to only the donor cylinders, while the remaining cylinders can operate at more efficient exhaust pressure levels. The donor manifold delivers a large pulse of exhaust gas to the inlet manifold one, two, or three times per engine cycle, depending on the number of cylinders attached to a donor cylinder manifold. These exhaust gas pulses may cause variation in an inlet gas stream entering the inlet manifold. Such variation may cause different cylinders to induct different percentages of exhaust gas that may result in air-fuel ratio and combustion inconsistencies leading to higher than optimum fuel consumption and emissions production.

In one approach, recirculated exhaust gas may be mixed with inlet air in a surge tank. The surge tank may be positioned upstream from an inlet manifold. The surge tank may enable exhaust gas to mix with inlet air more uniformly before entering the inlet manifold. Typically, exhaust gas recirculated from a donor cylinder requires a surge tank approximately ten times the cylinder displacement or volume of the donor cylinders in order to achieve uniform mixing of exhaust gas and inlet air.

BRIEF DESCRIPTION OF THE INVENTION

However, the inventor herein has identified issues with the above described approach. For example, while this approach may be useful in laboratory or stationary engine applications, the size of such a large surge tank is difficult to package in an engine compartment of a vehicle. Moreover, the additional inlet volume necessary to accommodate a surge tank can be detrimental to the acceleration rate of the engine. Furthermore, a large volume surge tank has added cost and weight penalties.

In one embodiment, an engine system includes a first cylinder group, a second cylinder group, an inlet manifold coupled to the first cylinder group and the second cylinder group, an inlet passage coupled to the inlet manifold to provide inlet air to the inlet manifold, a first exhaust manifold coupled to the first cylinder group, a second exhaust manifold coupled to the second cylinder group, and a mixer pipe positioned within the second exhaust manifold and/or the intake passage to mix exhaust gas recirculation (EGR) gases exhausted by the second cylinder group (and that are delivered through the second exhaust manifold) with inlet air. The mixer pipe forms an inlet end that is coupled to the second exhaust manifold and an outlet end that is located upstream of the cylinders in the first cylinder group and the cylinders in the second cylinder group.

In this way, substantially uniform EGR distribution may be provided to all cylinders of an engine with a donor cylinder configuration, even as inlet air and EGR flow varies.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventor herein has recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to systems, devices, and methods for mixing Exhaust Gas Recirculation (EGR) gas with inlet air so that a substantially or approximately uniform air-gas mixture may be inducted into all cylinders of an engine system of a vehicle. More particularly, the present description relates to mixing EGR gas with inlet air over a specific length of a mixer pipe that is a function of cylinder displacement or volume and inlet duct size (e.g., cross sectional area). For example, the mixing length may be substantially or approximately an even multiple a quotient of a cylinder volume of a cylinder in a donor cylinder group and a mixer pipe volume. Furthermore, the specific mixing length may be long enough to decay higher order non-uniformity of multiple EGR pulsations over several engine cycles. In contrast, a shorter length solution may generate more intense turbulence that causes a drop in manifold pressure and correspondingly a reduction in engine operating efficiency. By mixing EGR gas and inlet air over the specific length upstream from all cylinders of the engine system, the variation of the EGR percentage in the inlet stream to each of the cylinders may be reduced. Such an approach is particularly advantageous in engines having a plurality of cylinders with one or more donor cylinders dedicated to EGR that may produce a highly pulsed exhaust stream.

Figure 1:
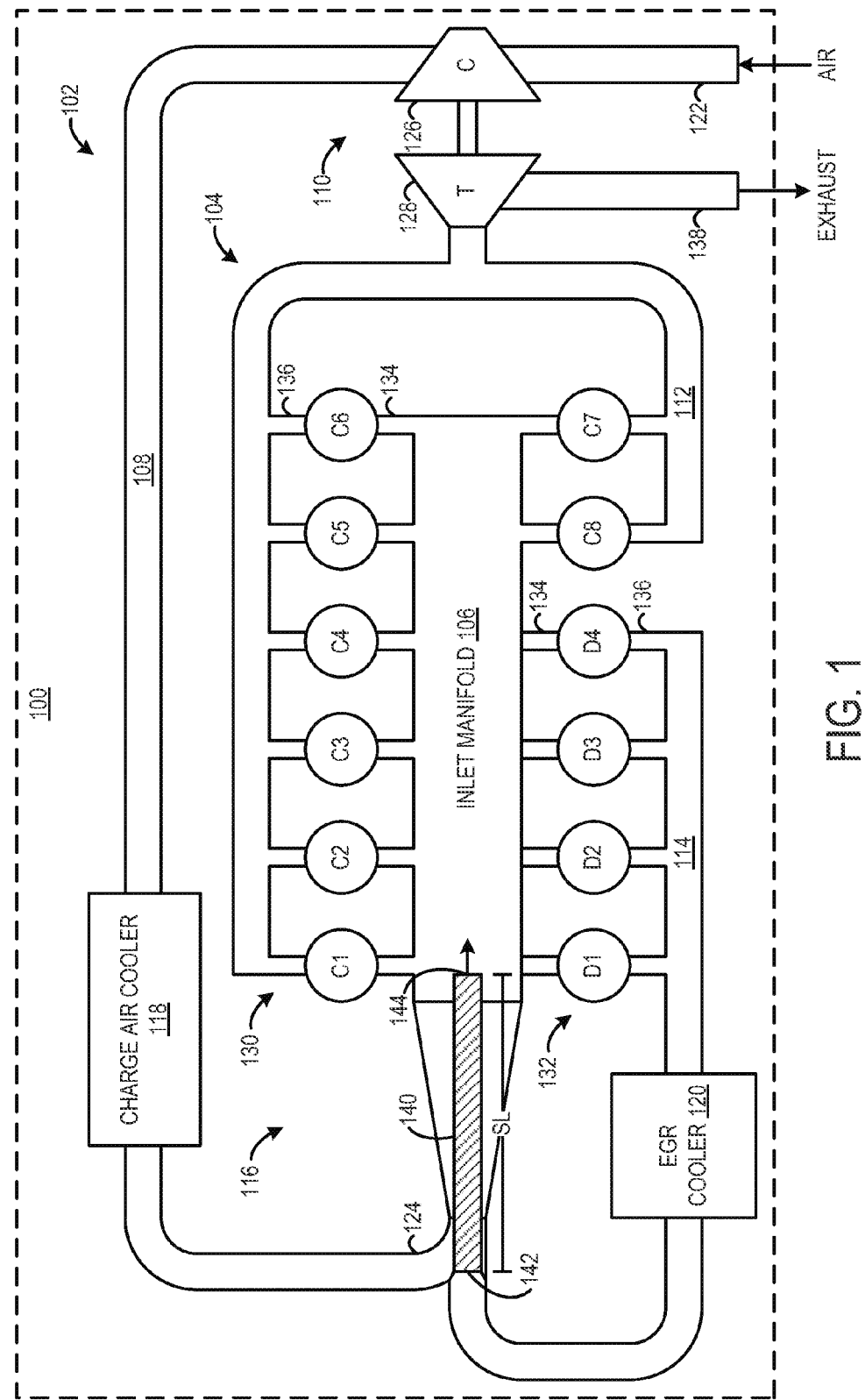
FIG. 1 schematically shows an embodiment of an engine system.

FIG. 1 shows an embodiment of an engine system 102 coupled to a vehicle 100. For example, the vehicle 100 may include a locomotive, marine vessel, Off-Highway Vehicle (OHV), etc. The engine system 102 includes a plurality of cylinders 104, an inlet manifold 106, an inlet passage 108, a turbocharger 110, a first exhaust manifold 112, a second exhaust manifold 114, and an EGR system 116. In some implementations of engine system 102, turbocharger 140 is not included. In some implementations, engine system 102 further includes a charge air cooler 118 and an EGR cooler 120.

The inlet passage 108 supplies fresh air to the engine system 102. The inlet passage 108 includes an air induction inlet 122, and an outlet 124 that couples to the inlet manifold 106. Air enters the air induction inlet 122 from the environment and passes through a compressor 126 of the turbocharger 110.

In some implementations, the air induction inlet 122 includes a bypass connecting upstream and downstream of the compressor 126 and including a valve disposed in the bypass to further control the effects of compressor 126 on the flow of fresh air to the inlet manifold 106. In the illustrated implementation, the engine system 102 does not include a throttle valve positioned in the inlet passage 108. However, in some implementations, the inlet passage 108 may include a throttle valve positioned downstream of the compressor 126.

The turbocharger 110 includes the compressor 126, which is coupled to a turbine 128. Rotation of the turbine 128 drives the compressor 126 compressing air passing through the air induction inlet 122 to increase the mass of air flowing to the inlet manifold 106. Further, a charge air cooler 118 is disposed in the inlet passage 108 downstream of the compressor 126 and upstream of the inlet manifold 106. In some implementations, the charge air cooler 118 is in fluid communication with a liquid coolant and cools compressed air before the air is directed to the engine via the inlet manifold 106.

The plurality of cylinders 104 includes a first cylinder group 130 and a second cylinder group 132, with at least one cylinder in each cylinder group. Each of the plurality of cylinders 104 includes at least one inlet port 134 and at least one exhaust port 136. In the illustrated implementation, the first cylinder group 130 includes eight cylinders and the second cylinder group 132 includes four cylinders. It will be appreciated that each of the cylinder groups may include any suitable number of cylinders. The first exhaust manifold 112 is coupled to the first cylinder group 130, and the second exhaust manifold 114 is coupled to the second cylinder group 132.

Each of the cylinders in the first cylinder group 130 couples to the first exhaust manifold 112 via the exhaust port 136. An exhaust passage 138 is coupled to the first exhaust manifold 112 to receive exhaust gases from the first cylinder group 130. Exhaust gases from the first cylinder group 130 flow from the first exhaust manifold 112, through the exhaust passage 138, where they are emitted to the environment. The exhaust passage 138 may include exhaust gas after-treatment devices, elements and components to treat exhaust gases, for example, a diesel oxidation catalyst, three-way catalyst, particulate matter trap, hydrocarbon traps, SCR catalyst system, lean NOx trap, etc. Further in the illustrated implementation, exhaust gases from the first cylinder group 130 drive the turbine 128 of turbocharger 110. The cylinders in the first cylinder group 130 are referred to as non-donor cylinders, since exhaust gases from these cylinders do not contribute to EGR and instead flow to exhaust passage 138.

Each of the cylinders in the second cylinder group 132 couples to the second exhaust manifold 114 via exhaust ports 136. Exhaust gases from the second cylinder group 132 flow from the second manifold 114 and are routed to the inlet manifold 106 as EGR gases. The second exhaust manifold 114 couples to the inlet passage 108 to mix EGR gases with inlet air. In the illustrated implementation, the second cylinder group 132 is coupled exclusively to the second exhaust manifold 114 such that all exhaust gases exhausted from the second cylinder group 132 are directed from exhaust port 136 to only the second exhaust manifold 114. Note, in some implementations, the first exhaust manifold 112 is coupled to the exhaust ports 136 of at least the first cylinder group 130, but, may be coupled to exhaust ports 136 of the second cylinder group 132 as well. The cylinders in the second cylinder group 132 are referred to as donor cylinders, since exhaust gases from these cylinders contribute to EGR gases that are routed to the inlet manifold 106.

In some implementations cylinders of the second cylinder group 132 may be positioned in a same bank of the engine system 102. Such a configuration reduces complexity of exhaust manifold construction, for example by having no cross-bank manifold connections. Such exhaust manifold configuration simplicity reduces exhaust manifold construction costs. However, the donor cylinder and non-donor cylinder configuration produces an un-periodic EGR stream that increases EGR variation in the inlet manifold 106. In the illustrated embodiment, the donor cylinder and non-donor cylinder configuration produces uneven EGR pulsations. For example, the illustrated configuration may have a left-right cylinder firing order (e.g., C1, D1, C5, C8, C3, D3, C6, C7, C2, D2, C4, D4). Such a firing order may produce an unequally spaced EGR pulses that may make tuning of EGR distribution difficult; especially under varying engine operating conditions (e.g., varying between partial and full load engine operation). For example, EGR distribution tuning, such as through a plurality of specifically spaced discrete distribution pipes, may be a function of engine speed and breathing length of EGR pulsations. Thus, if engine speed or air density varies, such tuning effects may be negated. As such, EGR distribution tuning alone may not produce even EGR distribution under varying engine operating conditions. Moreover tuning alone may create different turbulent events, such as refection waves and other imperfections of EGR flow in the inlet manifold 106.

The EGR cooler 120 is positioned in the second exhaust manifold 114. The EGR cooler 120 is in fluid communication with a liquid coolant or other coolant to cool the exhaust gases from the second cylinder group 132 as the gases pass through to the inlet passage 108. Additionally, the liquid coolant may be the same coolant as supplied to the charge air cooler 118, or a different coolant.

The EGR system 116 may include the inlet passage 108 and the second exhaust manifold 114. The EGR system 116 includes a mixer pipe 140 positioned at a confluence of the inlet passage 108 and the second exhaust manifold 114. The mixer pipe 140 is positioned within the inlet passage 108, the second exhaust manifold 114, and/or the inlet manifold 106 to distribute EGR gases among the inlet air. A diameter of the mixer pipe 140 may be less than a diameter of a duct where inlet air mixes with EGR gases. The mixer pipe 140 may form an inlet end that is coupled to the second exhaust manifold 114 so that EGR gases in the second exhaust manifold 114 flow into the mixer pipe 140. The mixer pipe 140 may form one or more perforations or openings that control distribution of EGR gases with inlet air. The mixer pipe 140 may form an outlet end 144 that is positioned upstream of the plurality of cylinders 104. By positioning the mixer pipe 140 upstream from the plurality of cylinders 104, EGR gases and inlet air may be sufficiently mixed before being inducted by the plurality of cylinders. As such, a percentage of EGR gas variation in the inlet stream to all of the cylinders may be reduced. The mixer pipe 140 may be constructed of any suitable material and may take various forms depending on implementation. In one implementation, the mixer pipe 140 is constructed of welded low carbon steel. Different mixer pipe configuration will be discussed in further with reference to FIGS. 4-7.

The mixer pipe 140 may be a specific length (SL) in terms of a volume of inlet air consumed by each of the cylinders in the first cylinder group 130 and the second cylinder group 132. In other words, the length of the mixer pipe 140 may be a function of cylinder displacement or volume and pipe size (e.g., cross-sectional area). For example, the length of the mixer pipe 140 may substantially or approximately equal an even multiple of a breathing length, which is a quotient of a cylinder volume and a cross-sectional area of the mixer pipe 140. A length of the mixer pipe 140 that is an even multiple of the breathing length may facilitate suitable mixing of EGR gases and inlet air that reduces turbulence in the inlet manifold 106 and reduces variation of a percentage of the EGR gases in an inlet stream inducted by the plurality of cylinders 104. Moreover, if the length of the mixer pipe 140 is increased to include at least multiple breathing lengths (e.g., twelve breathing lengths), the variation in EGR percentage is reduced through distribution of EGR pulsations over several engine cycles, even when the mixer length does not exactly equal an even multiple of the EGR pulsation. In other words, by making the mixer pipe 140 suitably long enough higher order non-uniformity may be decayed over several engine cycles. In such implementations, the variation in the EGR percentage may be proportional to an inverse of the mixer pipe length.

In the illustrated implementation, the mixer pipe 140 is orientated such that an outlet end 144 of the mixer pipe 140 is directed toward the inlet manifold 106. The outlet end 114 is positioned upstream of the plurality of cylinders 104. In this orientation, an uneven and un-periodic flow of EGR gases may be mixed adequately with inlet air to from an inlet stream in which the EGR gases are distributed substantially or approximately evenly among the plurality of cylinders 104.

Figure 2:
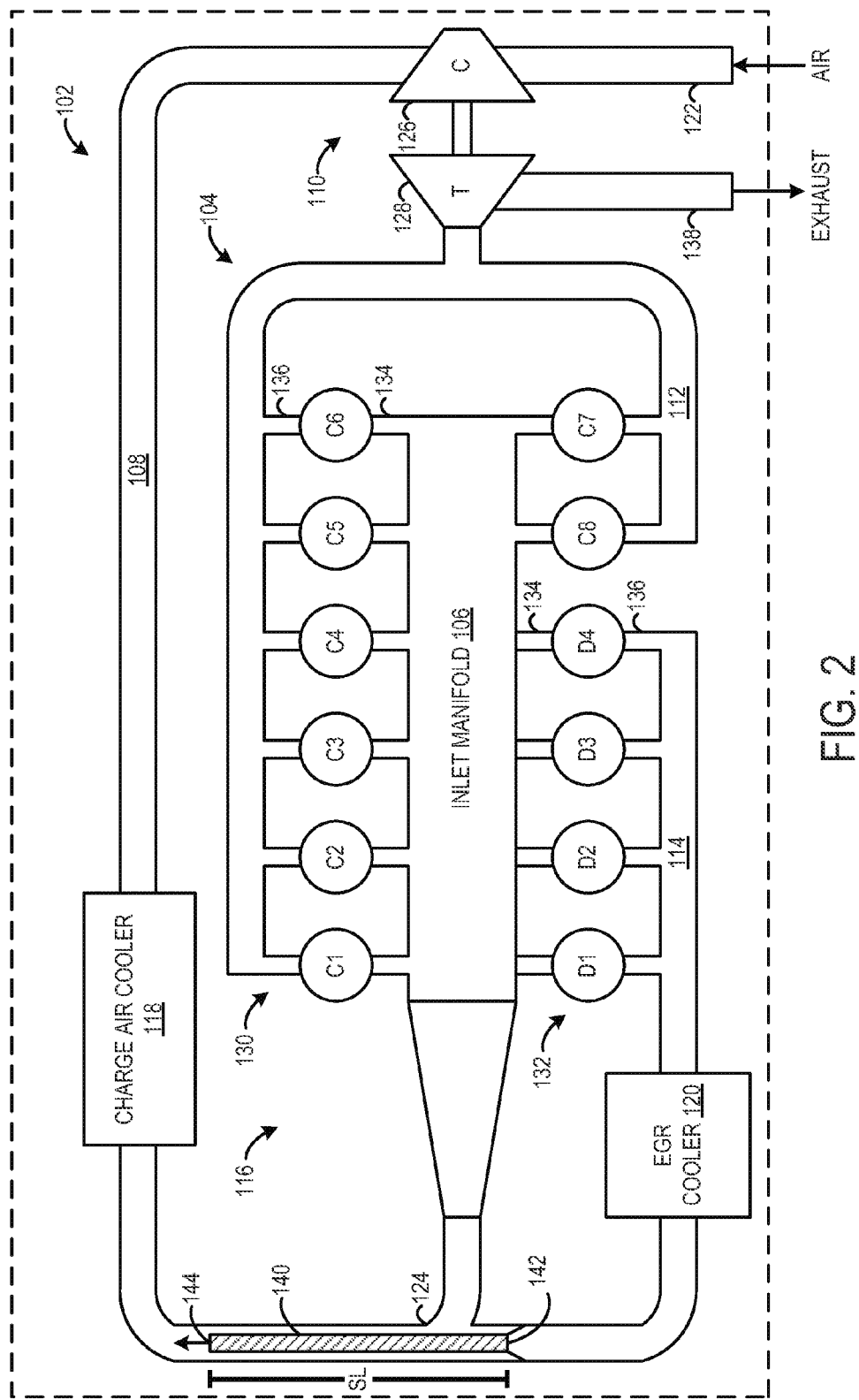
FIG. 2 schematically shows another embodiment of an engine system.

FIG. 2 shows another embodiment of the engine system 102. Components of the engine system 102 described above may function in a similar manner and are described in no further detail herein. In the illustrated implementation, the mixer pipe 140 is orientated such that an outlet end 144 of the mixer pipe 140 directs EGR flow towards the inlet passage 108 and away from the inlet manifold 106. In contrast, the configuration disclosed in FIG. 1 orientated an outlet end 142 of the mixer pipe 140 toward the inlet manifold. By directing EGR flow into the inlet passage, EGR gases may flow in a direction opposite of the inlet manifold 106. Such a flow direction of EGR gases may produce a backflow or backpressure that facilitates increased mixing of EGR gases and inlet air over the length of the mixer pipe 140 prior to entering the inlet manifold 106. As such, distribution of EGR gases and inlet air may be substantially or approximately equal to reduce a percentage of EGR variation inducted by the plurality of cylinders 104.

Figure 3:
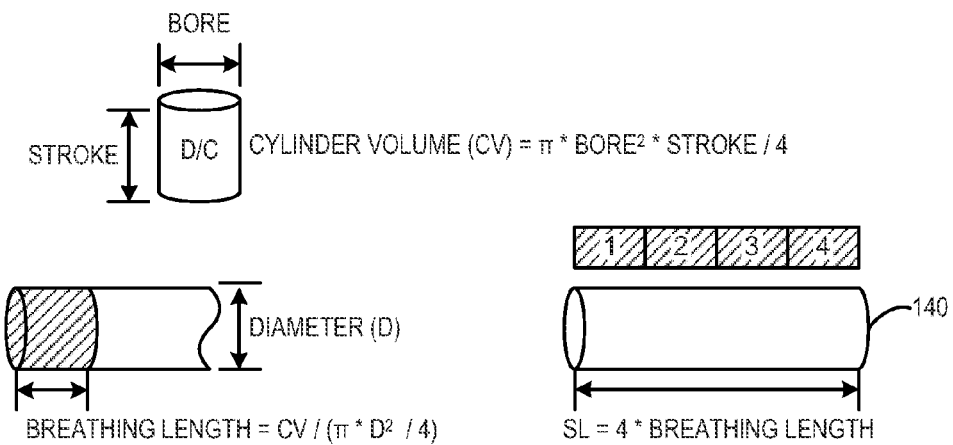
FIG. 3 schematically shows an embodiment of an Exhaust Gas Recirculation (EGR) mixer pipe.

FIG. 3 schematically shows an embodiment of the mixer pipe 140. As discussed above, the mixer pipe 140 may have a specific length (SL) that is a function of cylinder displacement or volume and mixer pipe size (e.g., cross-sectional area). For example, the mixing length may be substantially or approximately an even multiple of a breathing length defined in terms of volume of each EGR pulsation in the mixer pipe. More particularly, the breathing length may be defined in terms of cylinder volume (CV). The cylinder volume equals a product of $\pi$, the bore of the cylinder squared, the stroke of the cylinder, and ($\frac{1}{4}$), where the bore is a diameter of the cylinder, and the stroke is a length of the cylinder movement. The cylinder volume is used in the calculation of the breathing length. The breathing length of the mixer pipe 140 equals a quotient of the cylinder volume and the cross-sectional area of the mixer pipe (i.e., ($\pi$, the diameter of the mixer pipe squared, and ($\frac{1}{4}$))). In the illustrated implementation, the mixer pipe 140 has a specific length (SL) that is four multiples of the breathing length. In other words, the mixer pipe 140 has the capacity to hold four EGR pulsations generated by the donor cylinders. By making the length of the mixer pipe 140 an even (or whole) multiple of the breathing length, the mixer pipe 140 may have the capacity to allow uneven EGR pulses to mix substantially or approximately evenly with inlet air to reduce a variation of EGR percentage inducted by the plurality of cylinders 104.

Figure 4:
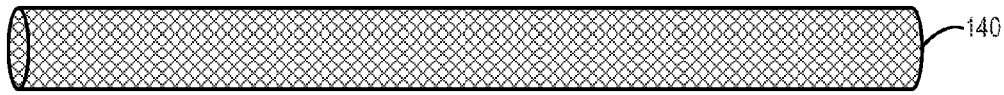
FIGS. 4-7 show different diffusion configurations that may be implemented in an EGR mixer pipe.

FIGS. 4-7 show different diffusion configurations that may be implemented in an EGR mixer pipe. FIG. 4 shows a diffusion configuration where the mixer pipe is constructed of a perforated mesh material. The perforated mesh material spans the circumference of the mixer pipe 140. The perforated mesh material provides suitable EGR flow restriction to enable diffusion of EGR gases into the surrounding inlet air stream over the length of the mixer pipe. Note the flow restriction created by the perforated mesh material may be low enough so as not to create substantial flow restriction that substantially increases the flow rate of EGR gas into the inlet manifold 106.

Figure 5:
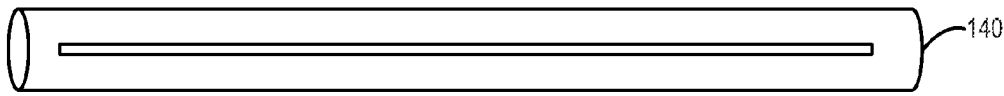

FIG. 5 shows a diffusion configuration where the mixer pipe forms a continuous narrow channel. The narrow channel spans substantially or approximately the length of the mixer pipe 140. The narrow channel provides suitable EGR flow restriction to enable diffusion of EGR gases into the surrounding inlet air stream over the length of the mixer pipe. The narrow channel may be positioned at any suitable location along the circumference of the mixer pipe 140. Note the flow restriction created by the narrow channel may be low enough so as not to create substantial flow restriction that substantially increases the flow rate of EGR gas into the inlet manifold 106.

Figure 6:
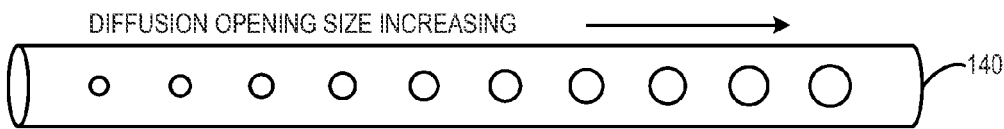

FIG. 6 shows a diffusion configuration where the mixer pipe forms a plurality of openings that vary in size along the length of the mixer pipe. For example, the opening size may increase along the length of the mixer pipe 140 in the direction of an outlet of the mixer pipe 140. The openings may be positioned at any suitable location along the circumference of the mixer pipe 140 and may be any suitable size. The varying opening size provides suitable EGR flow restriction to enable diffusion of EGR gases into the surrounding inlet air stream over the length of the mixer pipe. In the example where the opening size increases in the direction of the outlet of the mixer pipe, flow restriction may be greater toward an inlet end of the mixer pipe to provide greater EGR diffusion toward the inlet end of the mixer pipe. Note the flow restriction created by the varying opening size may be low enough so as not to create substantial flow restriction that substantially increases the flow rate of EGR gas into the inlet manifold 106.

Figure 7:
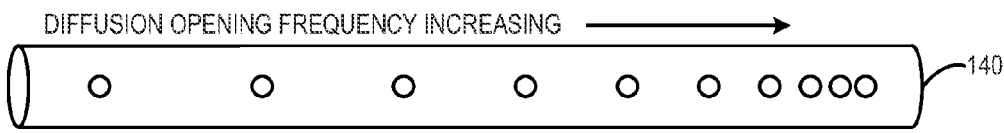

FIG. 7 shows a diffusion configuration where the mixer pipe forms a plurality of openings that vary in frequency or spacing along the length of the mixer pipe. For example, the opening frequency may decrease along the length of the mixer pipe 140 in the direction of an outlet end of the mixer pipe 140. The openings may be positioned at any suitable location along the circumference of the mixer pipe 140 and may be any suitable size. The varying opening frequency provides suitable EGR flow restriction to enable diffusion of EGR gases into the surrounding inlet air stream over the length of the mixer pipe. In the example where the opening frequency decreases in the direction of the outlet end of the mixer pipe, flow restriction may be greater toward an inlet end of the mixer pipe to provide greater EGR diffusion toward the inlet end of the mixer pipe. Note the flow restriction created by the varying opening size may be low enough so as not to create substantial flow restriction that substantially increases the flow rate of EGR gas into the inlet manifold 106.

An embodiment relates to an engine system comprising a first cylinder group, a second cylinder group, an inlet manifold, an inlet passage, a first exhaust manifold, a second exhaust manifold, and a mixer pipe. The engine system includes a plurality of cylinders; the first cylinder group comprises a first sub-set of the plurality of cylinders, and the second cylinder group comprises a second, distinct sub-set of the plurality of cylinders. (Each of the cylinders of the first sub-set may be characterized as a "first" cylinder, and each of the cylinders of the second sub-set may be characterized as a "second" cylinder. Thus, the first cylinder group includes at least one first cylinder, and the second cylinder group includes at least one second cylinder.) The inlet manifold is coupled to the first cylinder group and to the second cylinder group. The inlet passage is coupled to the inlet manifold to provide inlet air to the inlet manifold. The first exhaust manifold is coupled to the first cylinder group. The second exhaust manifold is coupled to the second cylinder group. The mixer pipe is positioned within the second exhaust manifold and/or the intake passage to mix exhaust gas recirculation (EGR) gases exhausted by the second cylinder group that are delivered through the second exhaust manifold with inlet air. The mixer pipe forms an inlet end coupled to the second exhaust manifold and an outlet end that is located upstream of the plurality of cylinders.

In an embodiment, the inlet passage is an openly aspirated inlet passage, meaning there is no throttle valve positioned in the inlet passage.

According to another aspect, "approximately" refers to the indicated condition or value plus or minus five percent, to account for relatively minor variances that do not affect the function in question.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system comprising:
   a v-engine having a first cylinder group including at least two cylinders and a second cylinder group including at least two cylinders, the first and second cylinder groups having a firing order that produces unequally spaced and un-periodic pulses of exhaust gas recirculation (EGR) from the second cylinder group, where a first portion of cylinders of the first cylinder group are included in a first bank of the v-engine, a second portion of cylinders of the first cylinder group are included in a second bank of the v-engine, and all cylinders of the second cylinder group are included in the second bank;
   an inlet manifold coupled to the first cylinder group and the second cylinder group;
   an inlet passage coupled to the inlet manifold to provide inlet air to the inlet manifold;
   a first exhaust manifold coupled to the first cylinder group;
   a second exhaust manifold coupled to the second cylinder group; and
   a mixer pipe positioned within the second exhaust manifold and/or the inlet passage to mix EGR gases exhausted by the second cylinder group that are delivered through the second exhaust manifold with inlet air, the mixer pipe forming an inlet end coupled to the second exhaust manifold and an outlet end that is located upstream of the at least two cylinders in the first cylinder group and the at least two cylinders in the second cylinder group.

2. The system of claim 1, wherein a length of the mixer pipe is approximately an even multiple of a quotient of a cylinder volume of a cylinder in the second cylinder group and a cross-sectional area of the mixer pipe.

3. The system of claim 1, wherein the outlet end of the mixer pipe is orientated in a flow direction toward the inlet manifold.

4. The system of claim 1, wherein the outlet end is orientated in a flow direction away from the inlet manifold and toward the inlet passage.

5. The system of claim 1, further comprising:
   an exhaust passage coupled to the first exhaust manifold to receive exhaust gas from the first exhaust manifold, the first exhaust manifold not being coupled to the second exhaust manifold, the inlet passage and/or the inlet manifold.

6. The system of claim 1, wherein the first and second cylinder groups have a left-right firing order.

7. The system of claim 1, wherein the mixer pipe forms a diffusion configuration including one of a perforated mesh, a narrow channel spanning approximately a length of the mixer pipe, a varying opening size, and a varying opening frequency.

8. The system of claim 1, wherein the inlet passage is an openly aspirated inlet passage.

9. The system of claim 1, further comprising:
   a turbocharger including a compressor positioned in the inlet passage and a turbine positioned in an exhaust passage, the compressor being coupled to the turbine so that rotation of the turbine drives the compressor;
   a charge air cooler positioned in the inlet passage downstream of the compressor and upstream of the inlet manifold; and
   an EGR cooler positioned in the second exhaust manifold between the second cylinder group and the mixer pipe.

10. An engine system comprising:
    a v-engine comprising a first bank including cylinders of a first cylinder group and second bank including cylinders of the first cylinder group and a second cylinder group, the first and second cylinder groups having a left-right firing order that produces unequally spaced and un-periodic pulses of exhaust gas recirculation (EGR) from the second cylinder group;
    an inlet manifold coupled to the first cylinder group and the second cylinder group;
    an inlet passage coupled to the inlet manifold to provide inlet air to the inlet manifold;
    a first exhaust manifold coupled to the first cylinder group and not coupled to the second cylinder group;
    a second exhaust manifold coupled between the second cylinder group and the inlet manifold to deliver EGR gases exhausted by the second cylinder group to the inlet manifold;
    an exhaust passage coupled to the first exhaust manifold to receive exhaust gas from the first exhaust manifold, the exhaust passage not coupled to the second exhaust manifold; and
    a mixer pipe positioned within the second exhaust manifold and/or the inlet passage, the mixer pipe including a plurality of openings to mix EGR gases exhausted from the second cylinder group with inlet air along a length of the mixer pipe, the plurality of openings varying in opening size or opening frequency along the length of the mixer pipe, the mixer pipe forming an inlet end coupled to the second exhaust manifold and an outlet end that is located upstream of at least one cylinder in the first cylinder group and at least one cylinder in the second cylinder group.

11. The system of claim 10, wherein the length of the mixer pipe is approximately an even multiple of a quotient of a cylinder volume of a cylinder in the second cylinder group and a cross-sectional area of the mixer pipe.

12. The system of claim 10, further comprising:
a turbocharger including a compressor positioned in the inlet passage and a turbine positioned in the exhaust passage, the compressor being coupled to the turbine so that rotation of the turbine drives the compressor;
a charge air cooler positioned in the inlet passage downstream of the compressor and upstream of the inlet manifold; and
an EGR cooler positioned in the second exhaust manifold between the second cylinder group and the mixer pipe.

13. The system of claim 10, wherein the outlet end is orientated in a flow direction toward the inlet manifold.

14. The system of claim 10, wherein the outlet end is orientated in a flow direction away from the inlet manifold and toward the inlet passage.

15. The system of claim 10, wherein a first portion of cylinders of the first cylinder group is positioned on the first bank, a second portion of cylinders of the first cylinder group is positioned on the second bank, and each cylinder in the second cylinder group is positioned on the second bank of the v-engine.

16. The system of claim 10, wherein the engine system does not include a throttle valve positioned in the inlet passage.

17. The system of claim 10, wherein the opening size increases in a direction of the outlet of the mixer pipe or the opening frequency decreases in the direction of the outlet of the mixer pipe.

18. A method of operating an engine system having a first cylinder group including at least one cylinder positioned on a first bank of a v-engine and at least one cylinder positioned on a second bank of the v-engine, a second cylinder group including at least two cylinders positioned on the second bank, an inlet manifold coupled to the first cylinder group and the second cylinder group; an inlet passage coupled to the inlet manifold to provide inlet air to the inlet manifold; a first exhaust manifold coupled to the first cylinder group; a second exhaust manifold coupled to the second cylinder group; and a mixer pipe positioned within the second exhaust manifold and/or the inlet passage, the method comprising:
firing cylinders of the first cylinder group and the second cylinder group in a left-right firing order to produce an unequally spaced and un-periodic stream of exhaust gas recirculation (EGR) from the second cylinder group that is delivered through the second exhaust manifold to the inlet manifold; and
mixing the unequally spaced and un-periodic EGR gases exhausted by the second cylinder group with inlet air through the mixer pipe, the mixer pipe forming an inlet end coupled to the second exhaust manifold and an outlet end that is located upstream of the at least one cylinder in the first cylinder group and the at least two cylinders in the second cylinder group so that a substantially or approximately uniform air-gas mixture may be inducted into all cylinders of the engine system.

19. The method of claim 18, wherein mixing the unequally spaced and un-periodic EGR gases exhausted by the second cylinder group with inlet air through the mixer pipe includes mixing the unequally spaced and un-periodic EGR gases exhausted by the second cylinder group with inlet air over a length of the mixer pipe that contains a plurality of most distantly spaced EGR pulses sized according to a cylinder volume of the second cylinder group.

* * * * *